Jan. 24, 1961   H. N. DEAN   2,968,891
APPARATUS FOR SEALING MULTIPLE SHEET GLAZING UNITS
Filed Oct. 1, 1956   3 Sheets-Sheet 1
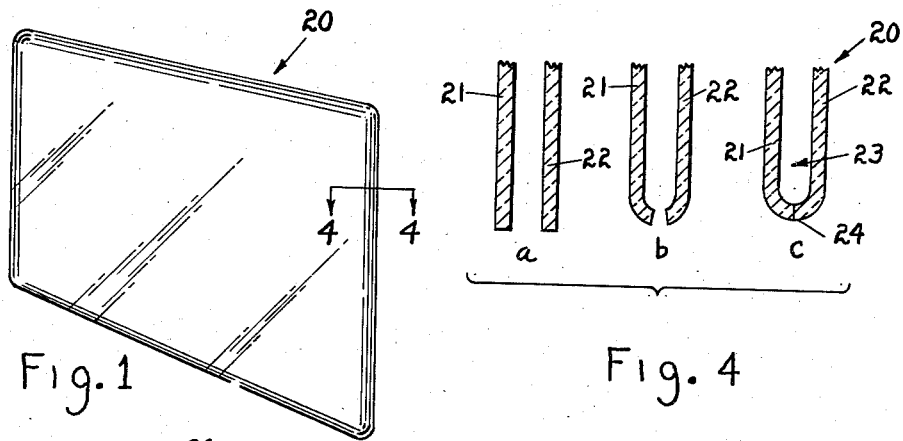
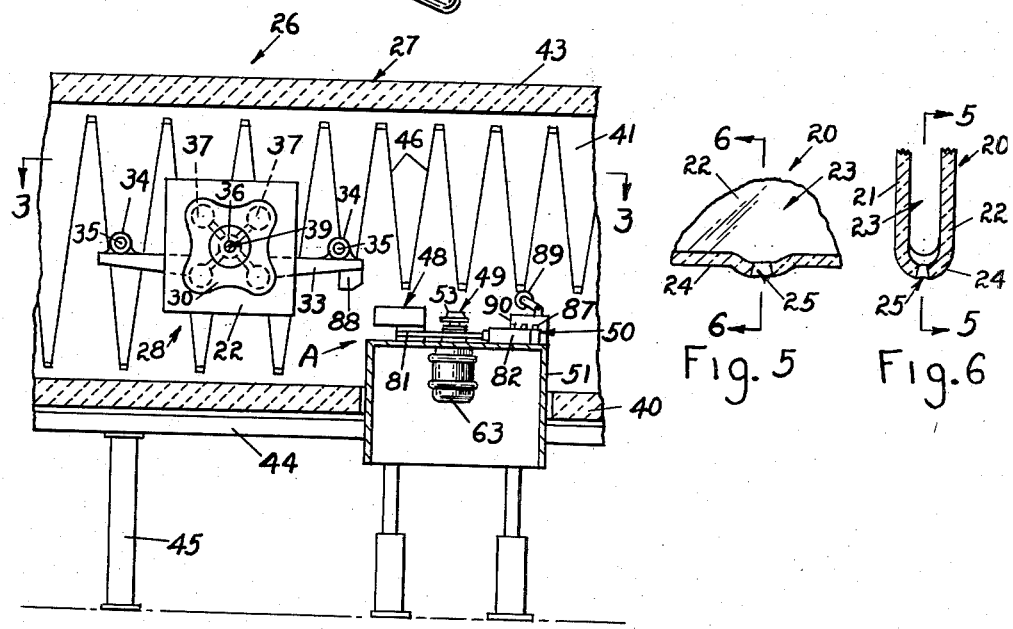
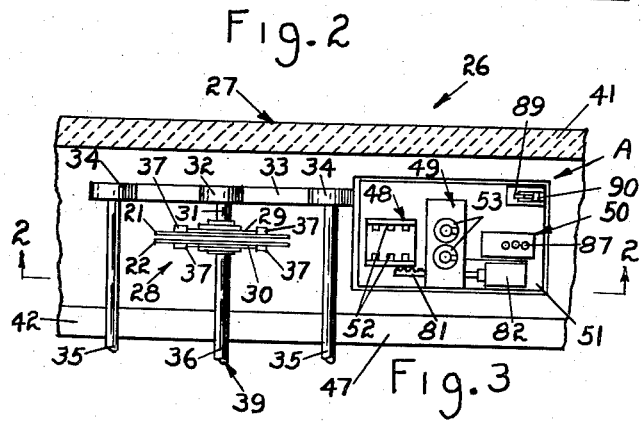
INVENTOR.
Harry N. Dean
BY
Nobbe & Swope
ATTORNEYS Jan. 24, 1961 H. N. DEAN 2,968,891
APPARATUS FOR SEALING MULTIPLE SHEET GLAZING UNITS
Filed Oct. 1, 1956 3 Sheets-Sheet 2
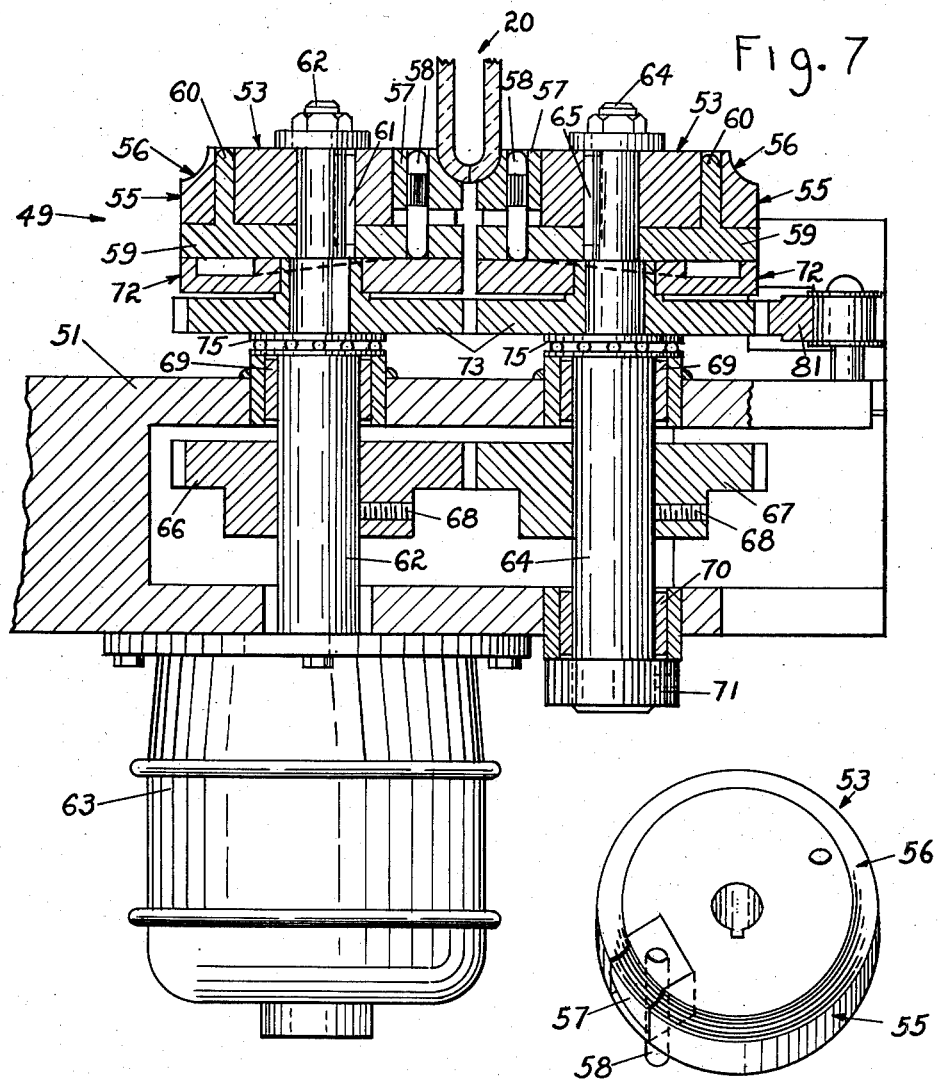
Fig. 7
Fig. 8
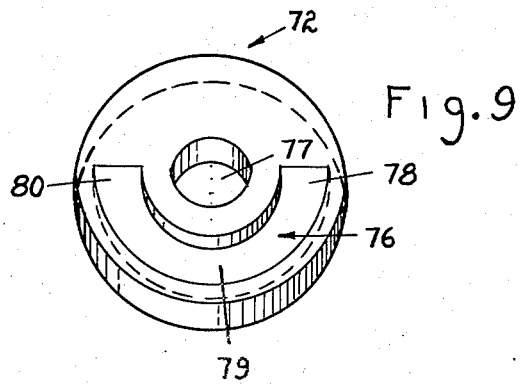
Fig. 9
INVENTOR.
Harry N. Dean
BY
Nobbe & Swope
ATTORNEYS Jan. 24, 1961   H. N. DEAN   2,968,891
APPARATUS FOR SEALING MULTIPLE SHEET GLAZING UNITS
Filed Oct. 1, 1956   3 Sheets-Sheet 3
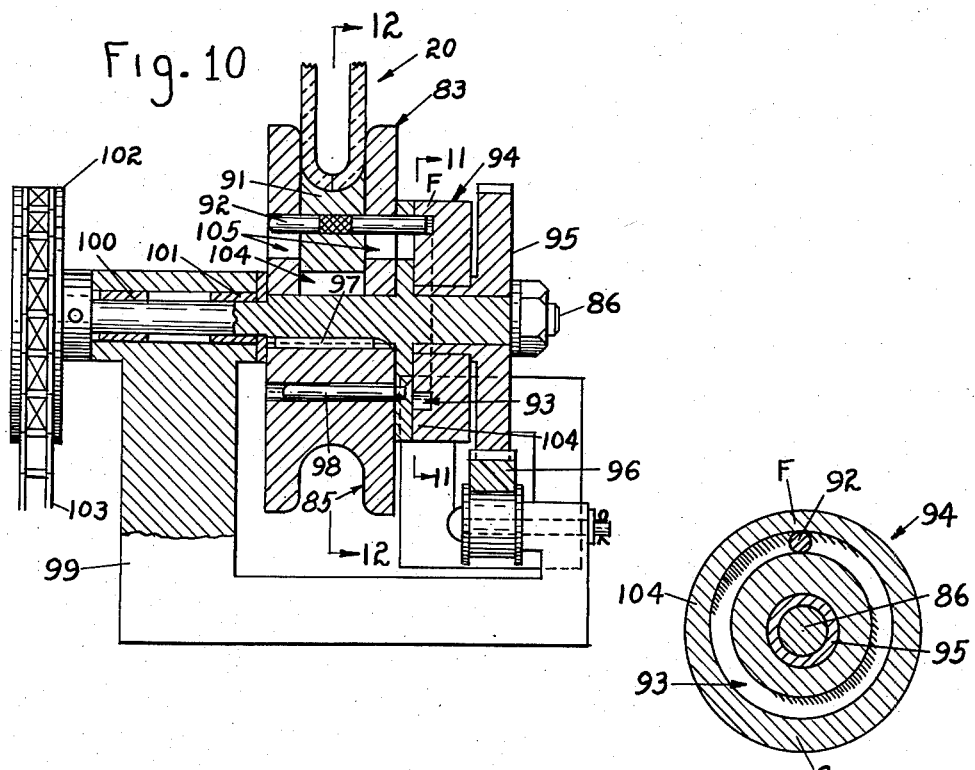
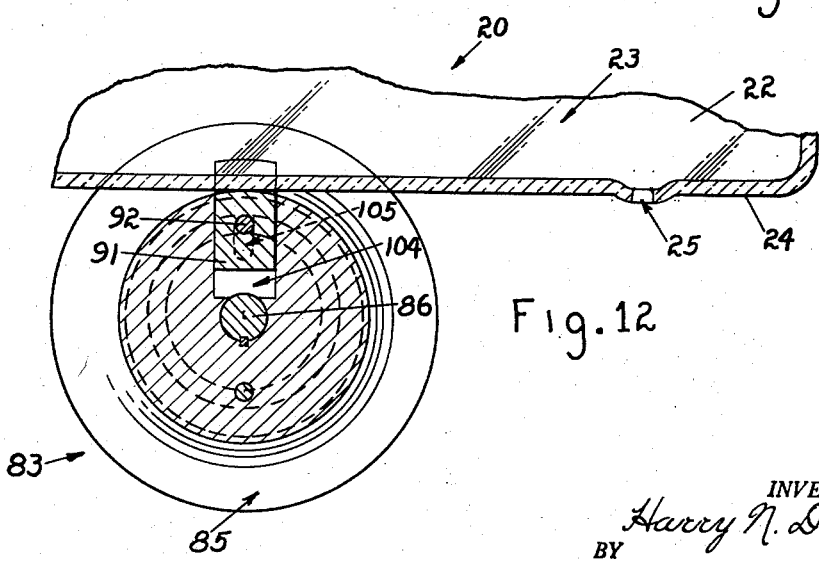
INVENTOR.
Harry N. Dean
BY
Nobbe & Swope
ATTORNEYS United States Patent Office 2,968,891
Patented Jan. 24, 1961

2,968,891
APPARATUS FOR SEALING MULTIPLE SHEET GLAZING UNITS

Harry N. Dean, Waterville, Ohio, assignor to Libbey-Owens-Ford Glass Company, Toledo, Ohio, a corporation of Ohio Filed Oct. 1, 1956, Ser. No. 613,331
4 Claims. (Cl. 49—1)

The present invention relates broadly to all-glass multiple sheet glazing units and more particularly to an apparatus for the forming of dehydration or breather holes in multiple sheet glazing units.

Multiple sheet glazing units may be described generally as comprising two or more sheets of glass in a spaced relation whose marginal edge portions are sealed entirely around, thus forming an hermetically sealed air space therebetween. Because of their insulating and condensation preventing qualities these units have found wide usage as windows in buildings, vehicles, and the like.

In order to obtain a multiple sheet glazing unit that has the desired heat insulating and condensation preventing qualities it is necessary that air containing moisture be removed from the space between the sheets of glass making up the unit. This can be done by either a partial evacuation of this space or by replacing the humid air with a dry air or a gas which is best suited for the condition in which the unit is to be used. In order to allow for the removal of moisture from the space between the sheets, after the sheets have been joined to enclose the space, an access hole must be provided in the sealing unit. Also after the space has been dehydrated the access hole must be sealed to again make the unit hermetically sealed.

A conventional manner of providing an access to the space between the sheets of glazing units of the type herein discussed is to cut an opening through one of the sheets before they are sealed together, so that there may be an equalizing of internal and external pressure while the sheets are being sealed together. However, holes of this type have several disadvantages in that the glass often breaks when being drilled or small cracks are produced around the hole in cutting, which will cause the glass to break under thermal shock. Additionally, when the holes are drilled through the glass sheets the sealed hole is, in many cases, exposed after the unit has been glazed leaving it vulnerable to sharp instruments such as glazier's putty knives.

Therefore, it is a primary object of this invention to provide an all-glass multiple sheet glazing unit in which a dehydration or breather hole is provided along a sealed edge of the unit.

Another object of this invention is to provide a relatively simple apparatus for forming dehydration or breather holes.

Still another object of the invention is to provide apparatus for forming dehydration or breather holes in the marginal sealed edge portions of the glazing units during the sealing of the sheets together.

A further object of the invention is to provide apparatus for forming dehydration or breather holes in multiple sheet glazing units while said sheets are moving relative to the heat source which is fusing the edges together.

A still further object of the invention is to provide an apparatus for forming dehydration or breather holes in the edge wall portions of all-glass multiple sheet glazing units as the edge walls are being formed.

Other objects and advantages of the invention will become more apparent during the course of the following description and when taken in connection with the following drawings.

In the drawings, wherein like numerals are employed to designate like parts throughout the same:

Fig. 1 is a perspective view of an all-glass multiple glazing unit of the type with which the present invention is concerned;

Fig. 2 is a fragmentary sectional view of the apparatus for the producing of glazing units according to this invention taken along line 2—2 of Fig. 3;

Fig. 3 is a fragmentary sectional plan view of the apparatus showing the conveyor apparatus in relation to the fusing burner, forming tool and polishing burner taken along line 3—3 of Fig. 2;

Fig. 4 is a fragmentary sectional view of a glazing unit showing 3 stages of its development, (a) before forming, (b) an intermediate step, and (c) the final sealed unit, a cross sectional view taken along line 4—4 of Fig. 1;

Fig. 5 is a fragmentary sectional view of a glazing unit taken along the line 5—5 of Fig. 6 showing dehydration or breather holes in a sealed edge wall of a glazing unit;

Fig. 6 is a fragmentary sectional view taken along line 6—6 of Fig. 5;

Fig. 7 is a fragmentary sectional view of the forming tool for sealing marginal edge portions of multiple sheet glazing units and including the apparatus for providing dehydration or breather holes in the sealed edge portions;

Fig. 8 is a perspective view of a forming wheel as used in the forming tool shown in Fig. 7;

Fig. 9 is a perspective view of a guide wheel used with forming wheel of invention;

Fig. 10 is a fragmentary sectional view of a modified edge forming tool used for the sealing of marginal edge portions of multiple sheet glazing units;

Fig. 11 is a perspective view of a guide wheel, as used with forming wheel in the modification shown in Fig. 10, taken along line 11—11 of Fig. 10; and Fig. 12 is a fragmentary sectional view of the forming tool and glazing unit taken along the line 12—12 of Fig. 10.

Although the present invention isn't of necessity limited to the formation of dehydration or breather holes in multiple sheet glazing units in conjunction with a particular apparatus or method, it still has a particular utility when used with the apparatus for the forming of glazing units described in the copending application Serial Number 464,012, filed October 2, 1954, now abandoned, in the names of Eldwin C. Montgomery, Harry N. Dean, Eugene W. Babcock, and Donald E. Sharp and will be described in that connection here.

Because it wasn't deemed necessary for a complete disclosure of the invention, some of the equipment which is used to produce glazing units, will not be described herein. If it is desired to obtain a more complete description, reference should be made to the copending application mentioned in the above paragraph.

Referring now to the drawings, there is shown in Fig. 1 an all-glass glazing unit 20 which is produced in accordance with this invention and which comprises two or more sheets of glass 21 and 22 spaced from one another as at 23 by the edge wall portions 24, as shown in Fig. 4(c). The dehydration or breather holes 25, with which this invention is concerned, are provided in at least one of the edge wall portions 24. Equalizing the pressure within the space 23 with respect to the pressure on the outside on the unit during and after the sheets are fused together is made possible through the instrumentality of the dehydration or breather holes. Also through these dehydration or breather holes is introduced dehydrated air or other gas, whichever is used.

As can be seen best in Figs. 2 and 3, the means by which the all-glass multiple sheet glazing unit 20 may be produced is designated generally by the number 26 which includes, a furnace 27, sheet supporting means 28, and a conveyor mounted adjacent to the furnace for carrying the sheets through the furnace (not shown). Within the furnace there are a plurality of sealing areas, only one of which is shown and designated by the letter A, through which sheets 21 and 22 pass during the sealing process.

Vacuum platens 29 and 30 have been provided to support the glass sheets 21 and 22 in a substantially vertical and spaced position with respect to one another as the sheets are carried through the furnace. In particular, a vacuum platen 29 is maintained on one end of a stub shaft 31 which is rotatably mounted adjacent, the other end is in a bearing 32 on cross arm 33. Cross arm 33 is supported by means of pillow blocks 34 between the ends of a pair of spaced support shafts 35 which are secured to conveyor system (not shown). Vacuum platen 30 is mounted on one end of a longer shaft 36 and is spaced from platen 29 a distance equal to the width of an all-glass multiple sheet glazing unit to be produced. The shaft 36 is rotatably journaled in a suitable bearing (not shown) and may be turned by a handle (not shown) for a purpose to be described hereinbelow.

As can be seen best in Fig. 2, each of the platens 29 and 30 has been provided with vacuum cups 37 by means of which a vacuum can be applied to the glass sheets in order to hold them against the faces of the respective platens. Grooves 38 have been provided along each of the faces of the platens to connect the vacuum cups 37 to a central opening 39 provided both in the stub shaft 31 and the longer shaft 36. A partial vacuum is created in the vacuum cups 37 through the instrumentality of a vacuum pump (not shown).

Turning now specifically to the furnace 27 (Fig. 2), it is constructed of a lower wall 40, two side walls 41 and 42, and an overhead or ceiling wall 43 all of which walls are made of firebrick or some other suitable material. The lower wall 40 is supported on its edges by longitudinally extended beams 44 which in turn are supported by vertical members 45. For the purpose of illustration only, heat has been supplied to the furnace 27 by Nichrome or other wire filaments 46 fastened to the side walls 41 and 42. However, any other well known heating technique may be used to produce the desired heating effect.

In order to permit support shaft 35 and shaft 36 to extend into the furnace so that platens 29 and 30 may support glass sheets 21 and 22 and move these sheets past a sealing station A, furnace 27 is provided with a slot (not shown) in the side wall 42, one side of which is defined by a longitudinal channel 47 which permits the platens 29 and 30 to move through the furnace and to pass each of the sealing stations.

In sealing station A, there is provided a fusing burner 48 (Figs. 2 and 3), a forming or shaping tool 49, and a polishing burner 50 all of which are mounted on a suitable frame 51 which extends into the furnace. The fusing burner 48 (Figs. 2 and 3) has rows of nozzles 52 mounted thereon. The nozzles 52 serve the purpose of directing the flames onto the edge portion of the glass sheets 21 and 22 as they move past and in that manner raise their temperature sufficiently high enough to produce a formable condition therein.

In station A after the marginal edge portion of a pair of glass sheets has been heated to a pliable stage by flames from nozzles 52 the sheets are moved into contact with the forming tool 49 consisting of horizontally mounted power driven forming wheels 53. Preferably each of these forming wheels 53 has a lower cylindrical portion 55 of a uniform circumference, while the upper portion of the forming wheels are tapered to form a concave portion 56. This concave portion 56 gives the desired curvature to the sealed edge wall 24 as the glazing unit moves through the forming station 49.

As the sheets leave the fusion burner 48 where the edge portion has been heated to a formable condition, they engage the forming wheels 53 which are driven substantially at the speed of the conveyor which carries the glass sheets through the furnace. These forming wheels force or urge the heated portion of the glass sheets together, thus forming a sealed edge wall 24. That is, the softened edges of the sheets on passing through the concave passageway are deflected from the surface of the forming wheels inwardly to a point where said edges are fused together (see Fig. 7).

As pointed out previously, it was formerly common practice in the production of multiple sheet glazing units to place dehydration or breather holes through the face portions of the glass sheets before their edges were sealed. This was shown to be undesirable in many instances, because of breakage which occured in drilling the sheets or because of fissures emanating from the drilled holes producing fractures when thermal shock took place.

According to the preferred embodiment of the invention, to alleviate this condition the dehydration or breather holes 25 (Figs. 5 and 6) are formed in an edge wall 24 of a glazing unit as the edge wall is being formed. This is accomplished by a device which is a part of the forming tool 49 (Fig. 7). As is shown in Figs. 7 and 8 the forming wheel 53 has a portion 57 of it which is free to move vertically. It is the moving downwardly or away from the glass sheets by this movable segment 57 at the appropriate time which produces an access hole 25 in a glazing unit 20.

As is shown particularly in Fig. 7, the movable segment 57 contains a pin 58 which is secured in the movable segment 57 by having been pressed into place, and the lower end of the pin 58 fits freely in a hole in a plate 59. The lower end of pin 58 and a projection finger 60 secure the forming wheel 53 and plate 59 so that they will rotate together. The left forming wheel 53 and plate 59 (Fig. 7) are secured by a key 61 to the upwardly extending shaft 62 of a motor 63. The right forming wheel 53 (Fig. 7) is fastened to a shaft 64 by a key 65. Spur gears 66 and 67 are respectively secured to the motor shaft 62 and the driven shaft 64 by set screws 68 and rotate the forming wheels 53 at a constant speed and with the movable segments 57 in timed relationship. Shafts 62 and 64 are enabled to rotate in the frame 51 by sleeve bearings 69 and 70, and shaft 64 has a collar 71 pinned to it at its lower extremity. Directly underneath plate 59 is guide plate 72, said guide plate being pressed onto the hub of gear 73 and both ride freely on shaft 62 and through the instrumentality of the thrust bearing 75 gear 73 is not rotated by the turning of shaft 62.

Fig. 9 shows a perspective view of a guide plate 72 and its guide channel 76. The guide plate 72 consists essentially of a disk-shaped piece of metal of uniform circumference with a center hole 77 and a channel 76 milled out of the surface of the disk in a path concentric with the circumference of the disk and extending in length for approximately one half of the circumference of the disk.

Starting at point 78 of guide plate 72 and proceeding along the channel, the depth of said channel increases uniformly until a point of maximum depth 79 is reached midway between 78 and 80. Continuing on from points 79 to 80 the depth gradually decreases until at 80 the channel is brought even with the surface of said guide plate (Fig. 9).

Gears 73, onto the hubs of which the guide plates 72 are pressed, are meshed together and said gear 73 on the right is meshed with the teeth of a rack 81 (Fig. 7). Therefore with the energizing of a solenoid 82 (Figs. 2 and 3), onto the armature of which rack 81 is securely attached, the rack will move and thus cause the gears 73 and the guide plates 72 to rotate. Also gears 73 are meshed together in such a fashion that the points of maximum depth 79 of guide channels, when the gears 73 are turned 180° by rack 81 are opposite each other, or in apposition, and directly underneath a glazing unit which would be moving through the forming tool 49. In a like manner, movable segments 57 must also be so placed as to be capable of being positioned directly opposite each other, or in apposition, when forming rolls 53 are rotated, this being accomplished by a suitable meshing of gears 66 and 67 and/or pinning of forming rolls 53 to shafts 62 and 64. When the motor 63 is energized so as to provide rotative power to the system as shown in Fig. 7, the forming rolls 53 on rotating move the movable segments 57 over the guide channel 76 (partly shown in Fig. 7 as dotted lines), and said movable segments 57 would begin to move in a downward direction (toward the motor 63) because of gravity acting on said segments and guide pins 58. As the forming wheels 53 continue their rotation the movable segments 57 continue their descent until they are directly at the point of the greatest channel depth 79 of guide channel. At this time the movable segments are positioned at the outermost edges of the forming wheels as seen in Fig. 7, said movable segments 57 being at the lower limit of their allowed travel. Further rotation of forming wheels would return the movable segments 57 to their original position as drawn in Fig. 7.

After the marginal edge portion of a glazing unit has been formed to the desired configuration any marks, scratches, or imperfections which may have been left by the forming wheel 53 or 83 may be removed by a fire polishing process. For this purpose a polishing burner 50 has been provided which consists of one row of nozzles 87, which throw impinging flames onto the sealed edge of the glazing unit 20 and heat the sealed edge, thus causing the scratches or imperfections to be blended into the rest of the glass surface.

According to the preferred embodiment of the invention (Fig. 7) dehydration holes are produced in the sealed edge 24 while the edge is being sealed. Thus, as the leading portion of the glazing unit 20 is in the polishing burner 50, actuating block 88 (Fig. 2), fixedly secured to cross arm 33, engages actuating arm 89 of switch 90. Actuating switch 90 energizes solenoid 82 which in turn moves rack 81 to the right (see Fig. 3). The rack has been so designed that when moved by the solenoid through its maximum displacement gears 73 and guide plate 72 are given a 180° turn. This 180° rotation turns the maximum depth 79 of guide channel 72 to a position directly opposite the corresponding point 79 of its companion guide plate, or toward the center of Fig. 7 underneath the passageway through which the glazing unit passes. As the forming wheels 53 turn bringing the movable segments 57 to the point at which they would normally engage the glass sheets, the pins 58 move downwardly under the pull of gravity into the guide channel 76 of guide plate 72 and thus the movable segments 57 are moved downwardly from the glass sheets. This downward movement of the movable segments 57 from the glass sheets, since the heated marginal edge portions are not being fused together as a result thereof, produces a dehydration or breather hole 25 in the sealed edge of a glazing unit 20 (see Figs. 5 and 6).

As the glazing unit continues on through the furnace after a dehydration hole has been made in the sealed edge, actuating block 88 proceeds to the right of actuating arm 89, releasing it, opening up switch 90, and de-energizing solenoid 82 which allows rack 81 (which is spring loaded) to return to its original position and in turn returns gears 73 and guide plates 72 to the position in which they were originally, or as shown in Fig. 7. At this point the remainder of the glazing unit's edge will be sealed as previously discussed. The dehydration holes of course are also sent through the fire polishing station 50 in which any marks, scratches, or imperfections produced on the glass during the making of the hole will be erased. It is, of course, apparent that the switch actuating arm 89 may be located at a number of different locations in station A, thus allowing the producing of a dehydration breather hole at any preferred point along the edge of the glazing unit.

According to the modification (Fig. 10), after a pair of glass sheets have had their edges brought to a formable condition the sheets are moved into contact with a forming wheel 83, said forming wheel consists essentially of a pulley-shaped wheel mounted on a substantially horizontal axle 86. The forming wheel 83 is preferably disk shaped, of a uniform circumference, and with its periphery hollowed out to produce a concave forming region 85. The concave periphery of the forming wheel provides the desired curvature or shape for producing the sealed edge wall 24 of the multiple sheet glazing unit 20.

Thus, according to the modification (Fig. 10), after the sheets have left the fusion burner 49, where the edge portions of the glass sheets have been heated to a formable condition, they engage the forming wheel 83, which is driven by axle 86 at substantially the speed of the conveyor which carries the glazing unit through the furnace, said forming wheel forcing the edge portions of the glass sheets into contact with one another and thus forming a sealed edge 24.

According to the modification (Figs. 10, 11, 12) the dehydration or breather holes are formed in an edge wall 24 of a glazing unit as the edge wall is being sealed. This is accomplished at the sealing station A and during the process of sealing the edge. Particularly as shown in Figs. 10, 11, and 12 a dehydration hole is produced in a glass unit by the moving downwardly, or in a direction away from the glass sheets, of movable segment 91 on the forming wheel 83 during the forming of a sealed edge, thus leaving an unsealed portion or hole in the otherwise sealed edge. As is shown in Fig. 10, the movable segment 91 contains a pin 92 which is secured in the movable segment 91 by press fitting said pin into a hole provided for it. One extremity of the pin 92 rides freely in the raceway 93 of guide wheel 94 (Figs. 10 and 11). Guide wheel 94 is pressed onto the hub of gear 95, the combination gear 95 and guide wheel 94 turn freely on shaft 86. Gear 95 is meshed with a rack 96 so that any movement of said rack will turn gear 95 and guide wheel 94.

Forming wheel 83, containing segment 91, is mounted on shaft 86 and secured to said shaft by means of key 97 and drive pin 98. Shaft 86 is mounted on a suitable frame 99 and is enabled to rotate in frame 99 by its being journaled in bearings 100 and 101. Shaft 86 is supplied with rotative power by means of sprocket 102, chain 103 and a motor (not shown). The speed of rotation, as in the previously discussed apparatus, is the same as the speed of the conveyor which carries the glass sheets through the furnace.

In Fig. 11 is shown guide wheel 94 as viewed looking directly into the open raceway 93. Guide wheel 94 consists of a disk-shaped piece of metal, of a uniform outside circumference, with a hole provided at its center for mounting onto the hub of gear 95 and a circular raceway or hollowed-out portion 93 which is eccentric with the outside circumference of guide wheel 94. As shown in Figs. 10 and 11 the pin 92, which is fixed in movable segment 91 and its extremity riding in the raceway 93 of guide wheel 94, holds the movable segment 91 at a distance from the center of axle 86 that is determined by whichever portion of the raceway the pin is riding in. The guide wheel 94 in Fig. 10 is so placed that the narrowest portion of the outer ring 104 of guide wheel 94, said portion referred to as F, is in the uppermost position and movable segment 91 is also moved to its uppermost position when said movable segment is rotated to a position adjacent to a glazing unit being sealed. As in the preferred embodiment of the invention, a solenoid, similar to 82, moves rack 96 a sufficient distance to turn gear 95, and hence guide wheel 94 through an angle of 180°. After having been turned through this 180° angle the widest portion of outer ring 104, shown as G in Fig. 11, of the raceway 94 would now be uppermost and the pin 92 would therefore move closer to the axle 86 on rotating to an upward position. The amount of this movement of segment 91 toward the axle 86 has been designed to be more than is necessary to allow the glass sheets to pass through the forming wheel 87 without fusing the edges. The movable segment 91 fits freely in the space 104 provided for it and, slots 105 in the forming wheel 83 provides space for the necessary vertical motion of the pin 92.

Reviewing now the formation of dehydration or breather holes by means of the modification, initially the forming apparatus is set up as is shown in Fig. 10, a motor (not shown) is supplying power by chain 103 which turns sprocket 102, which in turn causes shaft 86 to turn and thus forming wheel 83 to rotate. Also because guide wheel 94 has the point of closest approach of its external circumference and circumference of the raceway, in the uppermost position, when the movable segment 91 comes in contact with the glass sheets it will present a curvature substantially equivalent to the remainder of the periphery of the forming wheel 83. Therefore with no further change and with shaft 86 rotating, glass sheets coming through the forming station would be provided with a sealed edge.

Referring now to Figs. 2 and 3, the assumption will have to be made that the forming station 49 has been replaced with the modification as shown in Fig. 10, all other members remain as shown. Still referring to Fig. 2, as the glass sheets are passing through the forming station, actuating block 88 intercepts switch actuating arm 89. The operating of switch 90 energizes solenoid 82 which moves rack 96 a predetermined distance. Rack 96 turns gear 95 and guide wheel 94 through an angle of 180°, which turns the guide wheel 94 so that the part of said wheel shown as G is in the uppermost position (Fig. 10). Now as forming wheel 83 rotates bringing movable segment 91 into its uppermost position, pin 92 riding in raceway 93 will move said movable segment to a lower position and the glass sheets coming through the forming wheel 83 will not be formed at this point, thus an unsealed portion or access hole will be left in the otherwise sealed edge because of the release of the forming pressure. With the glass sheets being carried still farther, actuating block 88 releases switch actuating arm 89, solenoid 82 is deenergized and since the solenoid armature is spring loaded the rack 96 is returned to its normal position moving guide wheel 83 to the position as shown in Fig. 10. Thus, we have a glazing unit approximately as shown in Fig. 12 with a dehydration hole 25 and the forming wheel 83 continuing the sealing operation.

After an edge wall 24 has been sealed, as described for either the preferred embodiment of the inventor or the modification the glazing unit is rotated 90° as said unit approaches another sealing station. This rotation thus presents an unsealed pair of marginal edges to the second sealing station. The rotation is accomplished by means of a handle (not shown) on the end of shaft 36. Since the platens 29 and 30 are maintaining the glass sheets 21 and 22 securely, the torque placed on the shaft 36 by handle will cause the platens 29 and 30 to turn the sheets 21 and 22 and shaft 31 in the bearing 32. After this rotation the sheets are moved to the next sealing station and the procedure is repeated in the same manner as described.

It is of course, to be understood that the form of the invention disclosed herein is to be taken as the preferred embodiment thereof and that various changes in the shape, size and arrangement of parts may be resorted to without departing from the spirit of the invention or the scope of the sub-joined claims.

I claim:

1. Apparatus for producing all-glass multiple sheet glazing units, comprising means for supporting a pair of glass sheets in fixed spaced face-to-face parallel relation with repect to one another, means for moving said sheet supporting means rectilinearly along a definite path through a sealing furnace, heating means for raising the temperature of the marginal edge portions of said sheets to a pliable condition, means adjacent said rectilinear path for sealing portions of the marginal edge portions of the sheets together as they move along said rectilinear path to form edge walls while leaving other portions of said marginal edge portions unsealed to form an opening, said sealing means including a pair of rotatable forming wheels located in the path of movement of said glass sheets, and means for rotating the forming wheels in the direction of movement of the glass sheets, the peripheries of said forming wheels being disposed relative to one another to provide a restricted passage for receiving the heated marginal edge portions therebetween, the peripheral surfaces of the forming wheels having concavedly shaped portions for engaging the edge portions and shaping them into fusion contact with one another, each forming wheel having a recessed area in said peripheral surface, a segment received in the recess of each forming wheel and having an outer surface forming a sector of said peripheral surface of said forming wheel, means for normally maintaining each segment in its respective recess to complete the periphery of the respective forming wheel, and means actuating the maintaining means to lower the segment in its recess to interrupt the periphery of each forming wheel whereby the marginal edge portions will not be pressed into fusion contact with one another by the interrupted sector of said forming wheel.

2. In apparatus for producing all-glass multiple sheet glazing units as claimed in claim 1, in which the segment maintaining means includes a normally stationary annular plate disposed beneath each forming wheel and provided in its upper surface with a semi-circular channel, a pin secured to each segment and traversing a circular path on the upper surface of each normally stationary plate during rotation of the forming wheel relative to the respective plate, and means for rotating the normally stationary plates to locate the channels therein to cause the pin to lower the associated segment when said segment is not coacting with the remainder of the peripheries of the forming wheels to press the marginal edge portions into fusion contact with one another.

3. In apparatus for producing all-glass multiple sheet glazing units as claimed in claim 2, including spur gears carried by the annular plates and meshing with one another, a rack gear adapted to mesh with one of said spur gears to effect rotation of the plates in timed relation to one another, and means operating the rack gear to rotate the said spur gears and associated plates to move the channels therein to lower the pin of each of the segments in its recess to interrupt the periphery of each forming wheel as the recesses therein move relative to the marginal edge portions.

4. In apparatus for producing all-glass multiple sheet glazing units as claimed in claim 3, in which the rack gear operating means comprises a solenoid, and switch means connected in circuit with the solenoid and disposed in the rectilinear path of movement of the sheet supporting means, said sheet supporting means being adapted to engage said switch means to close the circuit through the solenoid during movement of the sheets through the restricted passage between the forming wheels to effect movement of the rack gear to rotate the annular plates.

References Cited in the file of this patent

UNITED STATES PATENTS

| | | |
|---|---|---|
| 1,448,351 | Kirlin | Mar. 13, 1923 |
| 2,077,305 | Batchel | Apr. 13, 1937 |
| 2,116,297 | Aurien | May 3, 1938 |
| 2,193,393 | Danner | Mar. 12, 1940 |
| 2,389,360 | Guyer et al. | Nov. 20, 1945 |
| 2,521,048 | Day | Sept. 5, 1950 |
| 2,624,978 | Hohmann | Jan. 13, 1953 |
| 2,761,248 | Cowley et al. | Sept. 4, 1956 |
| 2,761,249 | Olson et al. | Sept. 4, 1956 |